June 30, 1936. A. L. GUEST 2,046,117

ARC WELDING APPARATUS

Filed June 17, 1935

Inventor:
Arthur L. Guest,
by Harry E. Dunham
His Attorney.

Patented June 30, 1936

2,046,117

UNITED STATES PATENT OFFICE 2,046,117

ARC WELDING APPARATUS

Arthur Llewelyn Guest, Wrexham, England, assignor to General Electric Company, a corporation of New York Application June 17, 1935, Serial No. 27,095
In Great Britain June 22, 1934

11 Claims. (Cl. 219—8)

My invention relates to arc welding apparatus. It is of particular utility when applied to gas-arc torches of the type in which a jet of gas, such as hydrogen, is directed through an arc established between electrodes and caused to impinge upon the object to be heated.

For some applications of such torches it is necessary to stabilize, and locate comparatively accurately, the heating flame and therefore the arc which plays between the two electrodes. Where the axes of the electrodes are coplanar there is a tendency for the arc, which is normally bowed out in the general plane of the electrodes and directed toward the work, to be unsteady and continuously to oscillate about this position. For some applications, for instance in connection with seam welding in an automatic tube mill where wandering of the welding flame cannot be permitted beyond small limits, it is necessary to steady the general plane of the arc loop and sometimes positively control its oscillation through a small angle.

It is an object of my invention to provide an improved magnetic control which tends to stabilize the configuration of the arc loop.

It is the further object of my invention positively to control the oscillation of the arc loop by providing a plurality of magnetic fields acting thereon alternately along axes inclined to the general plane of the normal arc loop.

It is a further object of my invention to energize the electromagnets provided for generating said magnetic fields through the agency of rectifying devices so that the electromagnets are alternately energized on alternate half cycles of opposite polarity with current from the arc circuit substantially in phase with the current in the arc circuit.

A further object of my invention is to provide an automatic control for adjusting the positions of the electrodes relatively to one another and the controlling magnetic field or fields and thus compensate for their consumption during welding and accurately locate the welding arc relatively to the work to be welded.

Figure 1:
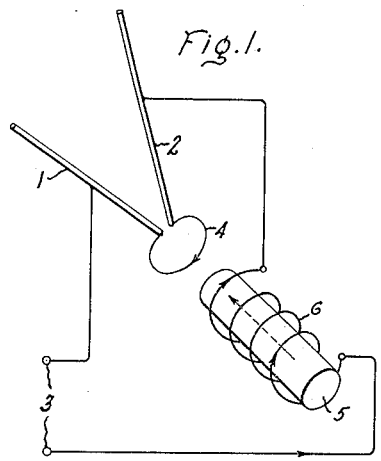
Figure 2:
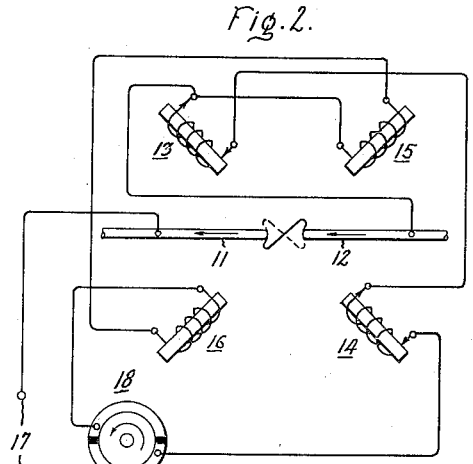
Figure 3:
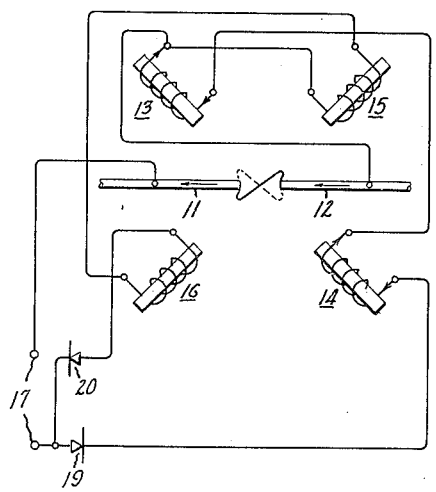
Figure 4:
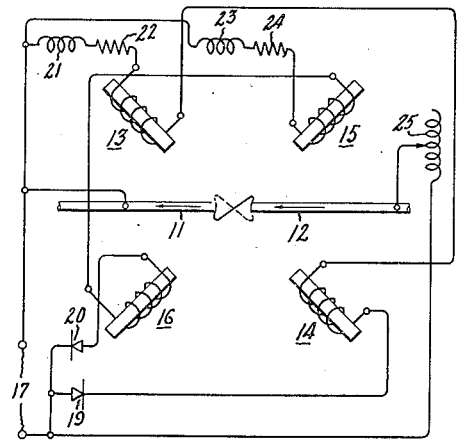
Figure 5:
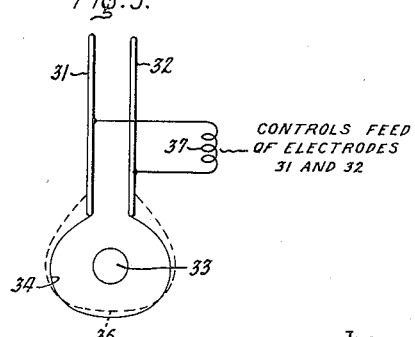

Further objects of my invention will become apparent from a consideration of the following description taken in connection with the accompanying drawing in which Fig. 1 is a schematic diagram illustrating the principles of the magnetic control of my invention; Fig. 2 is a schematic diagram of an arrangement according to my invention in which provision is made for two external magnetic fields to control the electric arc, which magnetic fields are excited from the arc circuit through the medium of a mechanical commutating device; Fig. 3 is an arrangement similar to that illustrated in Fig. 2 except that the external magnetic fields are excited from the arc circuit through the medium of rectifying devices; Fig. 4 is a schematic diagram illustrating a modification of the arrangement shown in Fig. 3; and Fig. 5 is a fragmentary diagram illustrating the principles upon which the invention may be applied for controlling the adjustment of the arcing electrodes.

Referring to Fig. 1, at 1 and 2 there are represented the electrodes of a gas arc torch commonly referred to as an atomic hydrogen heating torch. These electrodes, of the usual refractory metal type, are connected with a source of alternating current represented by the terminals 3 whereby an arc is maintained between the arcing tips, whilst through the arc space there is directed a stream of hydrogen. The arc playing between the electrodes 1 and 2 will tend to bow out away from the arcing tips into the form of a loop represented at 4 in the drawing, by reason of the magnetic field produced by the arc itself. At 5 there is represented an electromagnet the energizing coil 6 of which is conveniently connected in series with the electrodes 1 and 2 so as to be energized by the current flowing in the arc circuit. The electromagnet is so disposed in relation to the arc space that the magnetic field set up thereby is between the arcing terminals of the electrodes and the work and interlinks with the arc loop, said electromagnet being shown with its axis at right angles to the plane of the pair of electrodes 1, 2. With the electromagnet coil connected as shown the magnetic field due to the electromagnet 5 will, during the half-cycle of the alternating current supplied to the arc circuit in which the current flows in the direction indicated by the arrow heads shown on the circuit lines, act in the sense and direction indicated by the arrow shown in broken line, namely the same sense and direction as acts the magnetic field set up by the arc loop itself during this half-cycle. For the half-cycle of the current alternations during which the current flows through the arc circuit in the reverse direction, the external magnetic field produced by the electromagnet will act in the reverse direction as will also act the magnetic field due to the arc loop itself. Due to the interaction between the magnetic field set up by the arc loop and the external magnetic field established by the electromagnet 5 the arc loop will tend to set itself in a general plane which is normal to the axis of the electromagnet. I have found that for large arc currents the arc loop is caused to contract whereas for small arc currents the loop is caused to expand. Thus by the use of the external magnetic field in the manner described a torch can be usefully employed with a much lower arc current than is practicable with the same electrode spacing where no external magnetic field is provided.

It is of course apparent that the electromagnet for producing the external magnetic field instead of being energized directly by its series connection in the arc circuit, may be energized indirectly from the arc circuit namely through the medium of a current transformer. Further the electromagnet may be energized with its coil connected in series circuit with a reactor and resistance which circuit is mutually in shunt with the arc and the reactor which is usually provided in series with the arcing electrodes for current limiting purposes, the reactance and resistance included in the energizing circuit for the electromagnet being provided with a view to ensuring that the external magnetic field set up by the electromagnet will be substantially in phase with the arc current. Such an arrangement is shown in Fig. 4 which is described below.

In the arrangement illustrated in Fig. 2, the arc between the electrodes 11 and 12, which are represented in plan and between which a gas stream is directed, is adapted to be subjected to the action of two external magnetic fields. The external magnetic fields are set up by pairs of electromagnets 13, 14 and 15, 16 disposed so that the magnets 13, 14 are coaxial and have their axis inclined to the general plane of the normal arc loop which, in this case, namely in which the electrodes 11 and 12 are coplanar, would be substantially in the plane of the electrodes, while the electromagnets 15 and 16 are coaxial and have their axis inclined to the general plane of the normal arc loop and substantially in quadrature with the axis of the electromagnets 13 and 14. The pairs of electromagnets 13, 14 and the electromagnets 15, 16 are adapted to be alternately excited and for this purpose they have their exciting coils connected in respective circuits which are adapted alternately to be connected to the alternating current source of supply for the arcing electrodes through the medium of a mechanical commutating device 18. The exciting coils of the electromagnets 13, 14 are connected in series with the arcing electrodes 11 and 12 in accordance with the principles discussed in connection with Fig. 1, and similarly the exciting coils of the electromagnets 15, 16 are connected in circuit with the arcing electrodes 11 and 12, and these circuits are respectively connected to the source of alternating current at any desired rate of interchange by means of the commutating device 18 which for this purpose is driven at the appropriate speed. With this arrangement when the electromagnets 13 and 14 are excited the arc loop between the arcing electrodes 11 and 12 will, under the action of the magnetic fields created by the electromagnets 13 and 14, assume the position indicated by the full line, whilst the arc loop will assume the position indicated in broken line when the electromagnets 15 and 16 are energized. The same considerations with regard to stability and configuration of the arc discussed in connection with Fig. 1 will apply in the arrangement illustrated in Fig. 2, but in this latter case the arc can be caused to oscillate slowly or abruptly, and with precision, about the general plane of the normal arc which would play between the electrodes were no provision made for any controlling external magnetic fields.

In the modified arrangement illustrated in Fig. 3, in which figure those parts which are similar to parts in the arrangement illustrated in Fig. 2 are given correspondingly similar reference characters, the pairs of electromagnets 13, 14 and 15, 16 are adapted to be energized alternately from the source of alternating current 17 for the arc through the medium of rectifiers. Thus the coils 10 of the electromagnets 13, 14 are connected to the alternating current supply 17 through a rectifier 19 which may be of the dry-plate, discharge tube or other immobile type, whilst the energizing coils for the electromagnets 15 and 16 are connected to the source of alternating current for the arc in series with a similar rectifier 20, the rectifiers 19 and 20 being connected to the source of alternating current 17 in opposite sense. With this arrangement, for one half-cycle current will flow through the arc and coils of the electromagnets 13 and 14 in the direction indicated by the arrows thereby causing the arc to assume the position shown in full line whilst, for the reverse half-cycle, current will flow through the arc and coils of the electromagnets 15 and 16 in the reverse sense whereby the arc is caused to assume the position indicated in broken line.

In that modification of the arrangement illustrated in Fig. 3, which is depicted in Fig. 4, the coils of the electromagnets 13 and 14 are connected serially with the rectifier 19, a reactor 21 and preferably resistor 22, in a circuit connected to the alternating current supply for the arc, mutually in shunt with a circuit which includes the coils of the electromagnets 15 and 16, rectifier 20, reactor 23 and preferably resistor 24, and with a circuit which includes the arcing electrodes 11 and 12 in series with a reactor 25 for limiting the current in the arc circuit. The rectifiers 19 and 20 are connected to the supply 17 with opposite polarity. The reactors, and the resistors where present, are adjusted so that the currents in the branch circuits respectively, including the pairs of electromagnets 13, 14 and 15, 16 are in phase with the current in the arc. In all other respects, the arrangements made are similar to those for the embodiment of the invention illustrated in Fig. 3, and the same considerations as regards the controlling of the arc apply.

Referring now to Fig. 5, the electrodes 31 and 32 are disposed in parallel relation and a magnet, represented at 33, the end of which is some distance away from the plane of the arc bow or loop, is provided for establishing an external magnetic field interlinking with the arc loop in accordance with the principles hereinbefore discussed. In the initial or normal position of the tips of the arcing electrodes 31 and 32 the configuration of the arc will be roughly as represented by the loop 34. Assuming now that the arcing tips move upwardly, as they may do for instance due to being burned away in service, the arc will similarly move upwards and somewhat out of the region of greater field strength of the magnetic flux which spreads from the magnet end 33; there arises thus a tendency to reversion towards normal arc conditions wherein the size of arc bow is greater, and the arc voltage higher, as illustrated roughly by the form of arc shown by broken line at 36. The variation in arc voltage may readily be detected by means of a relay device, whose operating coil is indicated at 37, and utilized to effect automatic adjustment of the electrodes 31 and 32 in any convenient manner.

It is apparent that certain characteristic features of my invention are not limited to the embodiments illustrated and described, but are of general application to the art of arc welding. It is to be understood therefore, that I intend to cover all such modifications as fall within the true spirit and scope of the claims annexed hereto.

What I claim as new and desire to secure by Letters Patent of the United States is:

1. Arc welding apparatus having electrodes whose axes are so arranged relatively to one another that the arc established between said electrodes is blown out away from their arcing tips to form a loop directed toward the work, said apparatus including means for producing an electromagnetic field located between the arcing terminals of said electrodes and the work and interlinking the arc loop in the same sense as the field produced by said arc loop.

2. Arc welding apparatus having electrodes whose axes are so arranged relatively to one another that the arc established between said electrodes is blown out away from their arcing tips to form a loop directed toward the work, said apparatus including means for producing an electromagnetic field located between the arcing terminals of said electrodes and the work and interlinking the arc loop in the same sense and direction as the field produced by said arc loop.

3. Arc welding apparatus having electrodes whose axes are so arranged relatively to one another that the arc established between said electrodes is blown out away from their arcing tips to form a loop directed toward the work, said apparatus including means for alternately establishing between the arcing terminals of said electrodes and the work at least two magnetic fields which act on said arc along axes which are respectively differently inclined to the general plane of the normal arc loop and interlink said arc loop in the same sense as the field produced by said arc loop.

4. Arc welding apparatus comprising means for establishing an arc, means including electromagnets for establishing at least two magnetic fields which act on said arc along axes which are respectively differently inclined to the arc, and means including a commutating device for alternately energizing said electromagnets.

5. Arc welding apparatus having electrodes whose axes are so arranged relatively to one another that the arc established between said electrodes is blown out away from their arcing tips to form a loop directed toward the work, said apparatus comprising means including electromagnets for establishing fields located between the arcing terminals of said electrodes and the work and acting on said arc loop along axes differently inclined to the general plane of the normal arc loop and interlinking said arc loop in the same sense as the field produced by said arc loop, and means including a commutating device for alternately energizing said electromagnets with currents substantially in phase with the arc current.

6. Arc welding apparatus comprising a source of alternating current, means including a plurality of electrodes connected to said source of alternating current for establishing an arc, means including electromagnets for establishing magnetic fields acting on the arc established between said electrodes, and means including rectifying devices for alternately connecting said electromagnets in series circuit with said arc and for alternately energizing said electromagnets on alternate half cycles of opposite polarity of said source.

7. Arc welding apparatus comprising means for establishing an arc, means including electromagnets for establishing magnetic fields acting on said arc, a source of alternating current, and means including rectifying devices for alternately energizing said electromagnets on alternate half cycles of opposite polarity of said source.

8. Arc welding apparatus comprising an alternating current arc circuit, means connected in said circuit for establishing an arc, means including electromagnets for establishing magnetic fields acting on said arc, and means including rectifying devices for connecting said electromagnets in said arc circuit and for alternately energizing said electromagnets on alternate half cycles of opposite polarity with current from the arc circuit substantially in phase with the current in said arc circuit.

9. Arc welding apparatus having electrodes whose axes are so arranged relatively to one another that the arc established between said electrodes is blown out away from their arcing tips to form a loop directed toward the work, said apparatus comprising means including electromagnets for establishing at least two magnetic fields which are located between the arcing terminals of said electrodes and the work and act on said arc along axes which are respectively differently inclined to the general plane of the normal arc loop and interlink said arc loop in the same sense as the field produced by said arc loop, a source of alternating current, and means including rectifying devices for connecting said electromagnets to said source and for energizing said electromagnets on alternate half cycles of opposite polarity.

10. Arc welding apparatus having electrodes whose axes are so arranged relatively to one another that the arc established between said electrodes is blown out away from their arcing tips to form a loop directed toward the work, said apparatus including means for producing an electromagnetic field located between the arcing terminals of said electrodes and the work and interlinking the arc loop in the same sense and direction as the field produced by said arc loop, means for adjusting the positions of said electrodes relatively to said last mentioned means, and means responsive to the voltage between said electrodes for operating said adjusting means and for maintaining said arc in a predetermined position relative to said electromagnetic field.

11. Arc welding apparatus having electrodes whose axes are so arranged relatively to one another that the arc established between said electrodes is blown out away from their arcing tips to form a loop directed toward the work, means for alternately establishing between the arcing terminals of said electrodes and the work at least two magnetic fields which act on said arc along axes which are respectively differently inclined to the general plane of the normal arc loop and interlink said arc loop in the same sense as the field produced by said arc loop, means for adjusting the positions of said electrodes relatively to said magnetic fields, and means responsive to the voltage between said electrodes for operating said adjusting means and for maintaining said arc in a predetermined position relatively to said electromagnetic fields.

ARTHUR LLEWELYN GUEST.